Feb. 25, 1964     R. F. BERGER     3,122,598

PLASTIC DECORATING METHOD

Filed Nov. 3, 1960

INVENTOR.
RICHARD F. BERGER
BY
Stanley Sacks
ATTORNEY.

United States Patent Office 3,122,598
Patented Feb. 25, 1964

3,122,598
PLASTIC DECORATING METHOD
Richard F. Berger, Leominster, Mass., assignor to Foster Grant Co., Inc., Leominster, Mass., a corporation of Delaware
Filed Nov. 3, 1960, Ser. No. 77,766
5 Claims. (Cl. 264—247)

This invention relates generally to the art of decorating or marking plastic articles. More specifically this invention is directed to a novel method for manufacturing a decorated or marked, injection molded article and the article thereby produced.

Thermoplastic articles have been decorated or marked by many methods known to the prior art. In many cases the decoration is applied to the surface of the completed article employing conventional printing techniques. This surface decoration creates many unsolved problems. The decoration is subject to wear, abrasion, corrosion and adhesive problems. Specifically designed inks for various thermoplastic items have been developed, however, the foregoing problems have not been, to my knowledge, satisfactorily solved.

Some workers in the art have turned to methods which involve covering of the decorative material with a transparent protective layer. In most cases a molded plastic article is decorated and a protective layer is then applied by spraying, painting, laminating, etc. These methods are relatively expensive and create problems of adhesion of the covering layer to the base materials.

It is also known in the art that clear plastic material in sheet form may be reversely printed with a decoration. The film may be preshaped and laminated to a plastic base with the printed side adjacent to the plastic base. Another method of utilizing such a sheet or film is set forth in United States Patent Reissue No. 24,577 which discloses the use of a reversely printed film which is positioned in a mold. A blow molding technique is then employed to weld a plastic base to the film. This method of decorating thermoplastic objects is not entirely satisfactory. In a blow molding operation the thermoplastic backing or base material is preformed to some extent and then urged against the film at the relatively low pressure of approximately 50 lbs. per square inch. This method may result in incomplete bonding. The films employed are normally substantially planar and it is difficult to provide a film covered decoration which would cover a substantially non-planar surface.

I have now found, most unexpectedly, that decorated or marked thermoplastic articles comprising a thermoplastic base material as a substrate and an overlying firmly bonded transparent or translucent thermoplastic protective film can be readily achieved in a one "shot" injection molding operation. One skilled in the art would normally believe that it would be impossible to place a thin, decorated, thermoplastic film in a mold cavity and injection mold thermoplastic material thereagainst. On the contrary, I have found that the expected problems of film and decoration destruction or distortion due to the unusually high temperatures and pressures involved in injection molding can be overcome and do not seriously affect the quality of my completed item. In fact, a thermoplastic object having an extremely desirable bond and close conformance of the film to the thermoplastic base is obtained.

My injection molding techniques are especially suitable for the manufacture of dinnerware. It is well known that dinnerplates and the like are subjected to extreme conditions of use. Flatware such as knives and forks are employed directly on the top surface of thermoplastic dinnerplates tending to scratch and mar them. Stacking, washing and drying of dinnerware subjects such articles to severe conditions of use. The action of acids and bases in foodstuffs placed on dinnerplates creates corrosion problems. In accordance with my invention, these problems can be substantially eliminated since any deleterious influences act on the clear film overlying the decoration and do not affect the decoration itself. I have further developed certain modifications in conventional injection molding apparatus and techniques which enable rapid efficient bonding of a film material to a thermoplastic base even if said base is non-planar.

The article produced by my method comprises a thermoplastic base integrally united with an overlying transparent or translucent film. A decoration is located and integrally united with the overlying transparent or translucent film on one side and the thermoplastic base on its other side.

The article of my invention is formed in substantially conventional injection molding apparatus. A decorated or marked clear, transparent or translucent film is placed in a mold cavity along one wall thereof with the decorated or marked side facing the fill or injection side of the molding cavity. A thermoplastic material is then injected into the mold cavity in a heated, flowable form under pressure whereby the thermoplastic material fills the cavity and unites with the transparent film and in the process flattens the film and shapes it as one surface of the desired decorated molded product.

The transparent or translucent film employed must be capable of withstanding the high temperatures and pressures developed in injection molding without deterioration of its physical or chemical properties. It should also be scratch, solvent, abrasion, weather and heat resistant, immune to mild acids and bases, durable and should remain colorless during injection molding and forming operations and throughout a period of long use.

Well known processes of decorating the film may be employed, i.e., off-set, lithography, rotogravure, half-tone printing, metallic foil, decaling and the like. I prefer to employ a printing process wherein the ink adheres to the film material. The ink itself should be stable at the temperatures and pressures employed in injection molding the particular thermoplastic being utilized. Therefore, the choice of a suitable ink will be largely determined by the particular thermoplastic resin utilized in the molded object. In some cases it may be desirable to employ an ink which will bond to the thermoplastic resin base during molding.

Well known thermoplastic resins may be employed as the thermoplastic base material, e.g., styrene-acrylonitrile copolymers, polystyrene, impact polystyrenes containing natural and synthetic rubbers, cellulose esters, methyl methacrylates, polyethylene, polypropylene, synthetic linear polyamides or nylons, etc. The particular thermoplastic material will be selected in view of the particular usage of the finished article.

In making decorated dinnerware, i.e., plates, saucers, bowls, etc., corrosion, scratch and abrasion resistant properties, flexibility and heat distortion characteristics under modern washing conditions are of utmost importance. For this specific application a hard, non-brittle, heat resistant material such as styrene-acrylonitrile is desirable. Generally, the base thermoplastic material employed is preferably of the same material as the thermoplastic film employed as the decorated surface although combinations of thermoplastic materials may be employed. When the base or substrate and the surface film are the same, the problems of adhesion between the film and the thermoplastic base is substantially eliminated.

In certain cases, particularly when using styrene or styrene acrylonitrile, transparent biaxially oriented thermoplastic films are preferred because of their increased strength in handling. Biaxially orientation also tends to prevent uncontrolled, variable film shrinkage. Normally the thickness of such films ranges from about 0.001 to 0.5 mm. If the film is to be bonded to a curved or non-planar surface, it is preshaped as by conventional vacuum forming to a shape roughly similar to, but not identical to, such surface.

Normal injection molding conditions of heat and pressure will bond the base to the film. However, the durability and strength of the bond may be improved by inserting an adhesive layer on the surface of the film to be bonded. Proper selection of the adhesive is necessary should the completed article be subject to wear and other stresses at its decorated side even in normal use. It should be selected with regard to the particular film material and thermoplastic base material employed, particularly with respect to its ease of being spread over the decorated side of the film without effect on the decoration and of firmly bonding the film material to the thermoplastic base material at the heat and pressures employed in injection molding. When an adhesive based ink is employed for the decoration or marking, it is possible to achieve a firm bond, between the film and the thermoplastic base, by employing the supplementary adhesive only over those portions of the film which are not printed.

Adhesives particularly suitable for use in our invention include clear liquids based on the following resins: vinyl ester copolymers, such as vinyl chloride, vinyl acetate copolymers and vinyl chloride, vinyl vinylidene copolymers with or without the addition of acrylics; styrene-acrylonitrile copolymers; urea-formaldehyde polymers; ethyl cellulose and nitro cellulose resins. Normally the inks employed are based on the same resins as the adhesive and are pigmented with conventional heat stable inorganic and organic pigments such as carbon black, titanium dioxide, etc.

My invention is more fully disclosed in the accompanying drawings and description thereof which are merely illustrative of the invention and are not to be taken as limiting thereof. In the drawings like numerals indicate like parts.

Figure 1:
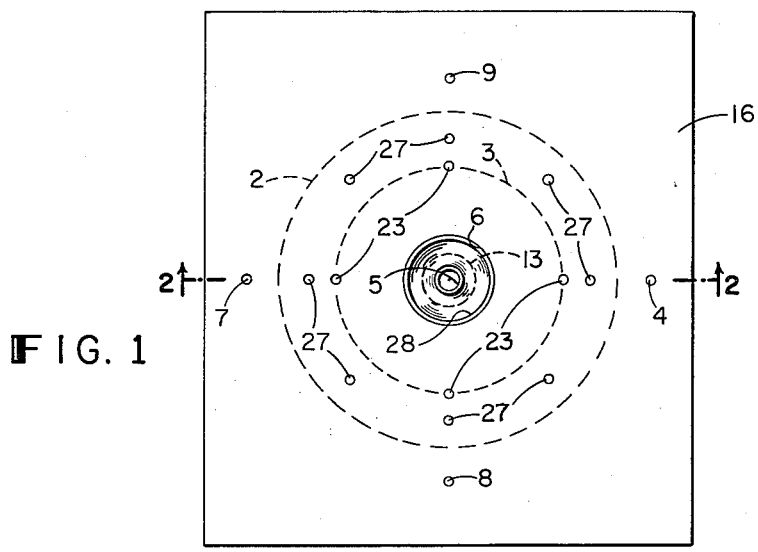
FIGURE 1 is a top plan view of the mold cavity blocks of my invention.

The drawings illustrate mold cavity blocks particularly suitable for injection molding of dinnerware. Only the mold cavity blocks are illustrated since these blocks may be employed with well known injection molding apparatus. The illustrated mold cavity blocks are employed in manufacturing dinner plates embodying my invention. It should be understood that the shape of the molding cavity may be varied to produce decorated thermoplastic objects of many articles conventionally molded by injection molding techniques, such as cups, glasses, wall and floor tiles, spoons, forks, bowls, rods, bars, spheres, combs, baskets, etc.

The mold cavity blocks are of substantially conventional design. As most clearly shown in FIGURES 1 and 2, fill cavity block 16 comprises a plate bottom forming surface 17, sprue entrance port 5 and a plastic injection nozzle receiving bore 6. Cavity block 15 comprises a non-planar plate top forming surface 18, cooling area 12, and substantially circular heating means 11. Conventional ejector pins 27 and additional cooling means 29 are utilized in these cavity blocks.

It should be noted that a long injection nozzle is employed enabling the tip 28 thereof to be positioned relatively closely adjacent the substantially flat portion of the molding cavity 17. Thus, a short sprue is formed by my machine. The sprue entrance port 5 is widened at its substantially circular cavity opening 13. The widened sprue entrance port allows the heated plastic from the plastic injection nozzle to enter the cavity and contact the film over a substantially large surface area thus aiding in preventing any tendency of the entering plastic material to distort the film and/or decoration.

Conventional locating means such as shown at 4, 7, 8 and 9 are employed to hold the film in the mold prior to injecting the thermoplastic material therein. Pins 4, 7, 8 and 9 are mounted in cavity block 15. When the mold is closed, an excess of film material 25 protrudes from the cavity. These locating or retaining pins extend upwardly from mold cavity block 15 and into corresponding holes 26 in mold cavity block 16, thus, passing through preformed holes in film 14 and positively preventing sliding or shifting thereof. The film may be pierced previous to placement in the mold and positioned with the pins 4, 7, 8 and 9 lying in the holes or alternatively the pins may be employed to form the holes. The locating pins may position the film in the cavity substantially against surface 18 as shown or the film may be spaced above this surface in the mold cavity.

Figure 2:
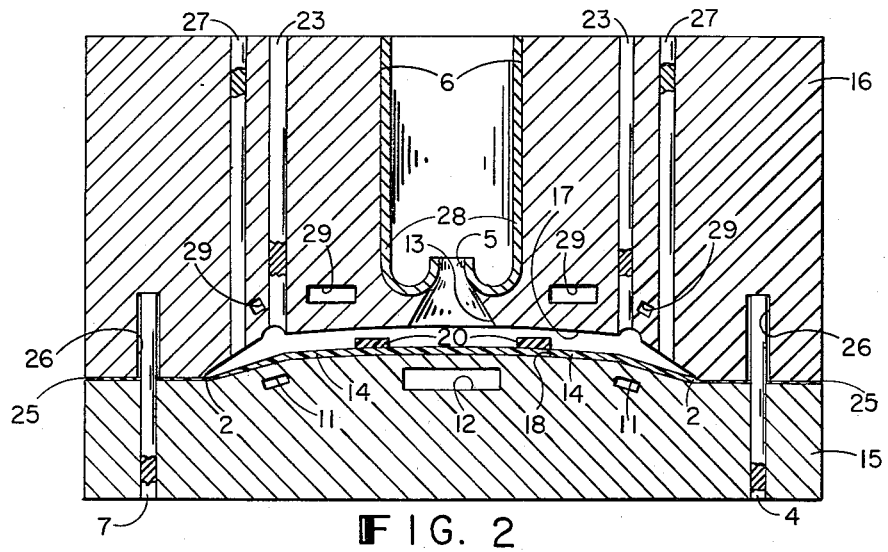
FIGURE 2 is a side section through line 2—2 of FIGURE 1.

When the base is non-planar, the thermoplastic film can be processed in a three step operation previous to its positioning in the mold cavity. The film is decorated or marked, coated with adhesive and preshaped. The particular order of these steps may be varied. The film is shaped by vacuum forming or other suitable means to roughly approximate the shape of wall 18 of the mold cavity. It is important, however, that the shaping of the film does not form it to the exact dimensions of the surface of the mold cavity since the film will necessarily stretch in the injection molding process due to the extremes of heat and pressure to which it is subjected and cause the wrinkling of film on the thermoplastic base. As can be seen at FIGURE 2, the preshaped film extends outwardly of the edge 2 of the mold cavity. The portion of the film within the edge 2 of the mold cavity comprises a surface area smaller than the surface area of surface 18 of the molding cavity. The particular ratio of surface area of film to surface area of the die face will vary depending on the particular configuration and size of the die face surface. Angled and curved surfaces will normally require a lower ratio of film surface area to die surface area than will substantially planar surfaces. The particular molding cavity illustrated is designed to mold a 10 inch diameter dinnerplate having a top surface area of approximately 83 square inches. The film employed with this molding cavity is preshaped to have a surface area on one side thereof such that a ratio of 0.96 to 1 is originally employed between said surface area and the surface area of the die respectively.

The advantageous method of my invention is preferably carried out with conventional vertical or horizontal opening molding machines utilizing cavity blocks of the type described. The mold cavity is opened and a thin, thermoplastic resin film is introduced into the cavity.

The film is located in position by retaining pins 4, 7, 8 and 9 and the mold cavity is closed. It should be understood that other retaining means may be employed. For example, a ring shaped member may be employed to clamp the outer film edge. Vacuum techniques or adhesives may also be employed as retaining means. Thermoplastic base material is then injected into the mold as in conventional injection molding.

The thermoplastic material is injected into the mold cavity through the widened sprue forming opening 13. As the thermoplastic material progressively fills the mold it presses the film 14 progressively from its center portion outwardly against the mold surface 18 of mold cavity block 15. The film is stretched slightly and shaped during this process. As can be readily seen in FIGURE 2, mold cavity block 15 is provided with heating means 11 at the areas where greatest forming of the film is accomplished in the molding operation. The heated area of the mold cavity surface 18 will soften the film to some extent to facilitate bending and stretching of the film at these areas. The use of these heated areas facilitates stretching and forming of the film, and prevents wrinkling and blistering of the film, thus resulting in a completed article wherein the decorated film is uniformly and integrally adhered to the thermoplastic base.

The particular molding cycle time, temperatures and pressure will vary depending on the particular thermoplastic film, ink and thermoplastic base material being molded. Generally, the properties of the base material will determine the particular values employed. Most unexpectedly, I have found that normal injection molding conditions of the thermoplastic base materials can be employed without adverse affects on the ink or the thermoplastic film.

After injection the molded dinner plate is cooled to a temperature at which it solidifies and the mold cavity is opened. The plate is then ejected from the mold by conventional means. Final processing of the plate is accomplished by trimming the excess film from the periphery of the plate.

It should be noted that the location of cooling means 12, which may be merely a cold water passage, will cool the center portion of the plate. This cooling action plays an important role in obtaining a non-distorted final product. After the plate has formed in the cavity it will be ejected by conventional ejector pins 27 which act on the rim of the plate. It is well known that in conventional molding when the mold is opened and the object ejected, said object is normally still hot and deformable to some extent. In the case of plates or substantially flat articles having decorations thereon it is important that no deformation occurs. The tendency towards bowing or distortion of the plate during ejection is substantially eliminated by the use of two expedients. First, sprue 40 is made as short as possible and the tip 28 of the injection nozzle is heated to a relatively high temperature thus preventing any tendency of sprue end to harden at the nozzle tip and stick thereto. The second expedient is the use of the cooling means as shown at 12. The central portion of the plate is cooled to a point where it is relatively hard. When the ejector pins 27 push against the plate rim the center portion of the plate being considerably hardened and having a hot soft short sprue end easily leaves the mold and does not tend to lag behind the rim and cause bowing of the flat portion of the plate.

Figure 3:
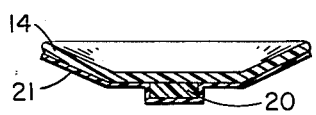
FIGURE 3 is a side sectional view of the adhesive coated film of my invention.
Figure 4:
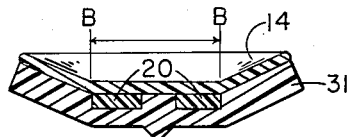
FIGURE 4 is a side sectional view of a completed thermoplastic object produced by the method of my invention.

FIGURE 3 illustrates the preshaped, transparent, thermoplastic film 14 which has been decorated as shown at 20 and coated with adhesive 21. This film is shown firmly and integrally joined to thermoplastic base 31 in FIGURE 4. The transparent layer 14 provides a scratch and wear resistant surface thus protecting and preserving the embedded decoration or marking.

It is obvious that if a flat surface is to be decorated or marked, employing the injection molding technique of my invention, it is not necessary to preshape the thermoplastic film employed. Thus, if it is desired to decorate the flat portion only (see FIGURE 4, portion B—B) of the dinnerplate, a flat circular disk is employed. The flat film disk is positioned in the mold cavity with the decorated side thereof facing the sprue forming opening 13. The flat film disk may be positioned and retained in the mold cavity during the molding procedure by the use of vacuum. Vacuum ports, such as circular openings approximately 0.002 inch in diameter, may be placed on a surface of a mold cavity block and the film positioned thereagainst. Thus, the film will be positively positioned and the stretching action of injected base material will not move said film. Positioning pins 23 may also be employed to locate the flat film disk. These positioning pins are preferably arranged in a circle at ridge portion 3 of the plate and the flat, film disk is positioned within said circle. When the mold cavity is closed the plastic base material is injected into the cavity and the positioning pins are withdrawn as soon as the first portion of the entering plastic contacts the film and presses it into position. The molding procedure would be identical to that described above for curved articles.

When employing styrene-acrylonitrile polymer as the material for the thermoplastic film and the thermoplastic base in my invention, conventional injection molding conditions are employed. Styrene-acrylonitrile is particularly suitable for manufacture of dinnerware as disclosed above. This polymeric material has a high heat distortion point, good flexural strength and is relatively hard and scratch resistant. Styrene-acrylonitrile polymers having average molecular weights such that 10% by weight solutions of these copolymers in methyl ethyl ketone have viscosities between 6 and 40, preferably 10 and 30, centipoises at a temperature of 25° C. possess the most desirable combination of physical and chemical properties.

In a specific embodiment, a 10 inch dinner plate may be molded of styrene-acrylonitrile material employing mold cavity blocks as shown in FIGURES 1 and 2. A 0.002 inch film of styrene-acrylonitrile copolymer is vacuum formed and decorated in a leaf pattern with ink, a silk screen printing method being employed. The ink employed is a pigmented, vinyl ester copolymer based ink which has satisfactory adhesion to styrene-acrylonitrile copolymers. The decorated side of the film is then coated with adhesive of similar composition to the base of the ink, the film is positioned in the mold cavity, retained around the edges of the cavity, and styrene-acrylonitrile base material is injected into the mold cavity at a temperature of from 390° F. to 530° F. preferably about 470° F. under an injection ram pressure of 6,000 to 24,000 p.s.i. preferably 11,400 p.s.i. using a molding cycle comprising a clamp time of 4 to 34 seconds, preferably 24 seconds, and an injection time of 5 to 20 seconds, preferably 10 seconds. Hot water at a temperature from 130° F. to 190° F. preferably 180° F., is circulated in heating means 11. The cycle is preferably carried out as fast as possible allowing sufficient time for the material to solidify within the mold and the ram pressure, preferably, is high as possible without flooding the mold.

Many changes and alterations may be made without departing from the spirit and scope of this invention which is set forth in the appended claims which are to be construed as broadly as possible in view of the prior art.

I claim:

1. The method of forming a decorated article comprising placing a homogeneous thermoplastic film adjacent a non-planar wall of a molding cavity, said thermoplastic film being preshaped and comprising on its side facing said wall a slightly smaller surface area than said wall and roughly conforming to the non-planar wall and carrying a decoration and adhesive means on its side facing the center of the mold cavity, said non-planar wall of said molding cavity being heated at lines of intersection of its surfaces, injecting a heated thermoplastic material under pressure into said mold cavity whereby said film is molded into conformity with said mold cavity wall and bonded to said injected thermoplastic material.

2. A method of forming an injection molded article having a protective surface thereon, said method comprising placing a homogeneous thermoplastic film adjacent a nonplanar wall of a molding cavity, said thermoplastic film being pre-shaped and comprising on its side facing said wall a slightly smaller surface area than said wall and roughly conforming to said nonplanar wall and said thermoplastic film comprising adhesive means on its side facing the center of the mold cavity, said nonplanar wall of said molding cavity being heated at lines of intersection of its surface, injecting a heated thermoplastic material under pressure into said mold cavity whereby said film is molded into conformity with said mold cavity wall and bonded to said injected thermoplastic material.

3. The method of claim 1 wherein said thermoplastic film is biaxially oriented.

4. The method of forming a decorated article comprising placing a homogeneous thermoplastic film adjacent a non-planar wall of a molding cavity, said thermoplastic film being preshaped and comprising on its side facing said wall a smaller surface area than said wall and carrying a decoration on its side facing the mold cavity, said non-planar wall of said molding cavity being heated at lines of intersection of its surfaces, injecting a heated thermoplastic material under pressure into said mold cavity whereby said film is molded into conformity with said mold cavity and bonded to said injected thermoplastic material.

5. The method of forming a decorated article comprising placing a homogeneous thermoplastic film adjacent a non-planar wall of a molding cavity, said thermoplastic film being preshaped and comprising on its side facing said wall a slightly smaller surface area than said wall and roughly conforming to the non-planar wall and carrying a decoration on its side facing the center of the mold cavity, said non-planar wall of said molding cavity being heated at lines of intersection of its surfaces, injecting a heated thermoplastic material under pressure into said mold cavity whereby said film is molded into conformity with said mold cavity wall and bonded to said injected thermoplastic material.

References Cited in the file of this patent

UNITED STATES PATENTS

| Re. 24,577 | Haines | Dec. 16, 1958 |
| 2,200,042 | Salz | May 7, 1940 |
| 2,311,156 | Casto | Feb. 16, 1943 |
| 2,313,985 | Bradshaw | Mar. 16, 1943 |
| 2,541,297 | Sampson et al. | Feb. 13, 1951 |
| 2,749,572 | Nowak | June 12, 1956 |
| 2,811,744 | Baldanza | Nov. 5, 1957 |
| 2,812,548 | Quinche et al. | Nov. 12, 1957 |
| 2,892,217 | Luboshez | June 30, 1959 |
| 2,900,666 | Marcus | Aug. 25, 1959 |
| 2,903,388 | Jonke et al. | Sept. 8, 1959 |
| 2,958,898 | Voumard et al. | Nov. 8, 1960 |

FOREIGN PATENTS

| 833,118 | Germany | Mar. 3, 1952 |
| 1,196,224 | France | May 25, 1959 |

OTHER REFERENCES

Grex: Molder's Guide to Injection Molding, received in Office August 7, 1958.